United States Patent
Mueller et al.

(10) Patent No.: US 6,186,039 B1
(45) Date of Patent: Feb. 13, 2001

(54) SPACECRAFT LAUNCH SYSTEM AND METHOD

(75) Inventors: George E. Mueller, Kirkland, WA (US); Aaron Cohen, College Station, TX (US); Dale D. Myers, Encinitas, CA (US); Henry O. Pohl, Seabrook, TX (US)

(73) Assignee: Kistler Aerospace Corporation, Kirkland, WA (US)

( * ) Notice: Under 35 U.S.C. 154(b), the term of this patent shall be extended for 0 days.

(21) Appl. No.: 09/030,511

(22) Filed: Feb. 25, 1998

(51) Int. Cl.$^7$ .................................................. F41A 9/00
(52) U.S. Cl. ......................................... 89/1.805; 89/1.815
(58) Field of Search ................................ 89/1.805, 1.809, 89/1.815

(56) References Cited

U.S. PATENT DOCUMENTS

| | | | |
|---|---|---|---|
| 2,968,410 | 1/1961 | Hamilton et al. ........................ | 214/1 |
| 2,987,964 | * 6/1961 | Logan et al. ........................ | 89/1.815 |
| 3,128,066 | 4/1964 | Bailey ................................ | 244/114 |
| 3,160,289 | 12/1964 | Leefer ................................. | 214/1 |
| 3,284,888 | * 11/1966 | McClain et al. ................... | 89/1.805 |
| 3,437,285 | 4/1969 | Manfredi et al. ....................... | 244/1 |
| 3,589,646 | 6/1971 | Mori .................................... | 244/7 |
| 4,265,416 | 5/1981 | Jackson et al. ........................ | 244/2 |
| 4,395,005 | 7/1983 | Ganssle .................................. | 244/161 |
| 4,410,151 | 10/1983 | Höppner et al. ........................ | 244/63 |
| 4,932,607 | 6/1990 | Layton et al. ........................... | 244/63 |
| 4,998,690 | 3/1991 | Wustefeld ............................... | 244/158 |
| 5,070,761 | * 12/1991 | Fidler .................................... | 89/1.809 |
| 5,209,433 | 5/1993 | Alexander et al. ............... | 244/114 R |
| 5,217,188 | 6/1993 | Thole et al. ........................... | 244/172 |
| 5,253,944 | 10/1993 | Preston .................................. | 403/13 |
| 5,294,078 | 3/1994 | Gurr ...................................... | 244/116 |
| 5,564,653 | 10/1996 | Ohayon ............................... | 244/114 R |
| 5,667,167 | 9/1997 | Kistler .................................. | 244/110 E |
| 5,850,989 | * 12/1998 | Trudeau et al. ..................... | 89/1.805 |

OTHER PUBLICATIONS

Steven J. Isakowitz, "International Reference Guide to Space Launch Systems," 1991 Edition, *American Institute of Aeronautics and Astronautics*, 1991, 295 pages.

* cited by examiner

*Primary Examiner*—Charles T. Jordon
*Assistant Examiner*—Theresa M. Wesson
(74) *Attorney, Agent, or Firm*—Baker & Botts, L.L.P.

(57) ABSTRACT

A spacecraft launch system includes a support assembly and a seat coupled to a hinge having a hinge axis. In operation, the support assembly and the seat rotate about the hinge axis to move the spacecraft from a horizontal position to a vertical position for launching. The launch system may incorporate an alignment technique that includes alignment members and actuators.

34 Claims, 5 Drawing Sheets

SPACECRAFT LAUNCH SYSTEM AND METHOD

TECHNICAL FIELD OF THE INVENTION

The invention relates generally to spacecraft launching, and more particularly to a spacecraft launch system and method.

BACKGROUND OF THE INVENTION

A traditional approach to fabricate, integrate, and launch spacecraft performs these operations while the spacecraft is in a vertical-orientation. This approach requires high bay areas, platforms or other scaffolding to access portions of the spacecraft, and a specialized transport to move the spacecraft from an assembly area to the launch site. Vertical processing of the spacecraft for launch introduces complexity, cost, and potential hazard since the spacecraft in a vertical orientation is more unstable and more difficult to access.

To overcome the limitations of vertical processing, some techniques perform integration and testing while the spacecraft is in a horizontal orientation. These prior systems that perform at least part of the pre-launch operations in a horizontal orientation benefit from a reduction in launch costs, complexity, and potential danger associated with vertical operations. Although some prior systems recognize the advantages of horizontal processing of a spacecraft, these systems fail to provide a cost-effective and reusable launch system that functions within an integrated launch services facility.

SUMMARY OF THE INVENTION

In accordance with the present invention, a launch system and method are provided that substantially eliminate or reduce disadvantages or problems associated with previously developed spacecraft launch systems and methods. In particular, the present invention provides a launch system that includes a support assembly and a seat that rotate about a hinge axis to move the spacecraft from a horizontal position to a vertical position.

In one embodiment of the present invention, a launch system includes a support assembly to support a spacecraft in a horizontal position and a seat to support the spacecraft during a transition from the horizontal position to a vertical position. A hinge is coupled to the support assembly and the seat, wherein the support assembly and the seat rotate about a hinge axis during the transition.

In another embodiment of the present invention, a method for moving a spacecraft from a horizontal position to a vertical position includes supporting the spacecraft on a support assembly in a horizontal position; aligning an aft portion of the spacecraft with a seat; and rotating the support assembly and the seat about a hinge axis to place the spacecraft in a vertical position.

Technical advantages of the present invention include a launch system that includes both a support assembly and a seat to support a spacecraft during a transition from a horizontal position to a vertical position. In a particular embodiment, the seat remains perpendicular to a longitudinal axis of the support assembly during the transition. After fueling and final preparation of the spacecraft for launch, the support assembly returns to its horizontal position. The launch system may integrate with a transport assembly to receive the spacecraft from a vehicle integration facility that, along with the launch system, is part of an integrated launch services facility. In a particular embodiment, the launch system includes alignment members and actuators to ensure proper alignment between the seat and an aft portion of the spacecraft. Also, the launch system may include a weight and a cooperative retention device that allows the support assembly and seat to rotate about the hinge axis without the need for hydraulics or other complex actuators. Moreover, an umbilical transfer mast integral with the support assembly provides access to the spacecraft while in the vertical position for fueling, monitoring, and other activities. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
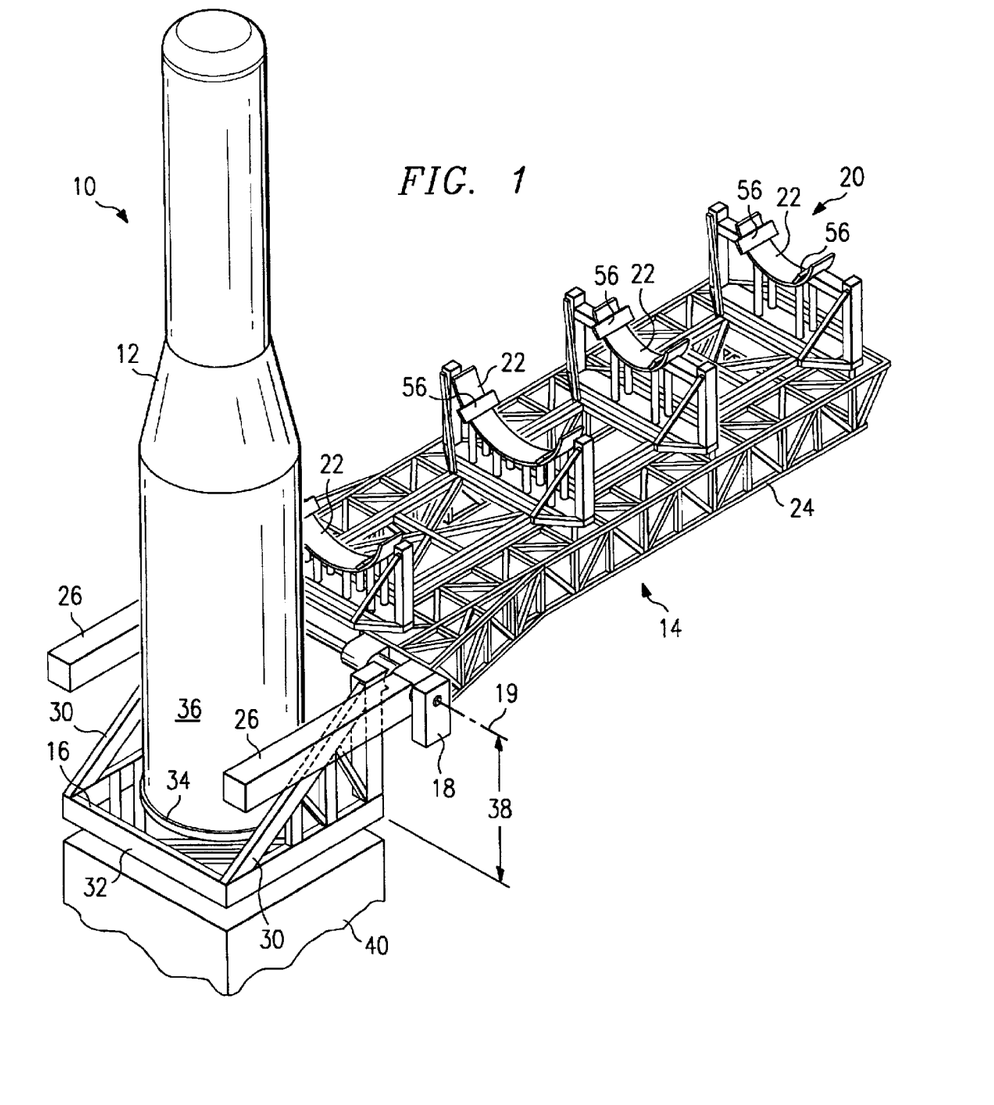
FIG. 1 illustrates a launch system in accordance with one embodiment of the present invention.

FIG. 1 illustrates a launch system 10 that moves a spacecraft 12 from a horizontal position to a vertical position for launching. Launch system 10 includes a support assembly 14 and a seat 16 coupled to a hinge 18 having a hinge axis 19. In operation, support assembly 14 and seat 16 rotate about hinge axis 19 to move spacecraft 12 from a horizontal position to a vertical position for launching.

Support assembly 14 includes a first portion 20 having a number of arcuate members 22 for supporting spacecraft 12 in a horizontal position. First portion 20 removably couples to a second portion 24, which in turn couples on one end to hinge 18 having a hinge axis 19. Hinge 18 comprises one or more axles, levers, pins, rollers, balls, sockets, or other devices that allow rotation of portions of launch system 10 about hinge axis 19.

Weights 26 couple to support assembly 14 on either side of spacecraft 12 opposite first portion 20. In a particular embodiment, the position of weights 26 may be variable with respect to hinge 18 to adjust the amount of rotational moment about hinge axis 19 generated by weights 26. Launch system 10 may also adjust the size of weights 26 to achieve a desired rotational moment about hinge axis 19.

Seat 16 is also coupled to hinge 18 and, like support assembly 14, also rotates about hinge axis 19. Seat 16 includes two support members 30 that couple to hinge 18 and a seat member 32 that includes an annular platform 34 that engages and supports an aft portion 36 of spacecraft 12. In a particular embodiment, support members 30 allow seat member 32 to rotate about hinge axis 19 at a desired offset 38. Offset 38 allows seat 16 to rotate about hinge axis 19 without obstruction, and permits a low elevation construction of hinge 18 and support assembly 14. Offset 38 also allows portions of spacecraft 12 to extend beyond hinge axis 19, which generates a portion of the rotational moment to move spacecraft 12 from a horizontal position to a vertical position. For example, offset 38 may be chosen to allow some or all of the engine weight positioned in aft portion 36 of spacecraft 12 to contribute to the erecting moment.

A take-off pedestal 40 couples to and supports seat 16 when spacecraft 12 is in the vertical position. The surface of take-off pedestal 40 is recessed below hinge axis 19 in accordance with offset 38.

Figure 2:
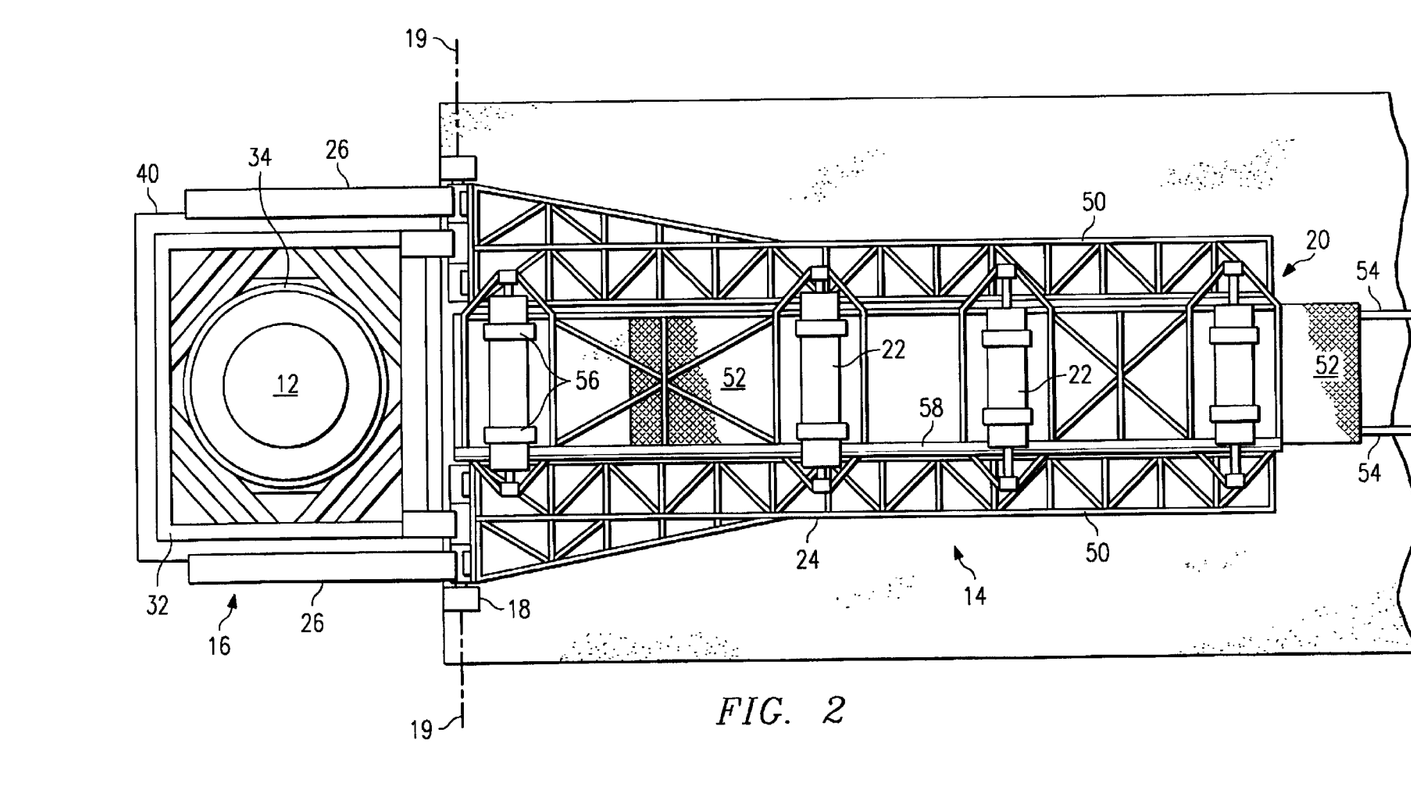
FIG. 2 illustrates the top view of the launch system and its associated transport assembly.

FIG. 2 is a top view of launch system 10. As seen from this perspective, first portion 20 having arcuate members 22, may be in one or more sections, and are coupled to second portion 24 which includes two sections 50 that removably couple to first portion 20 but also provide room for transport assembly 52. Transport assembly 52 moves along rails 54 connecting launch system 10 with a vehicle integration facility. Alternatively, transport assembly 52 may include wheels formed of rubber or other suitable material to move between launch system 10 and the vehicle integration facility. In this alternative embodiment, rails 54 may be unnecessary.

Upon assembly, integration, and testing of spacecraft 12, transport assembly 52 transports spacecraft 12 coupled to first portion 20 over rails 54 to launch system 10. Transport assembly 52 positions spacecraft 12 and first portion 20 between sections 50 of portion member 24. Before or after final alignment of aft portion 36 of spacecraft 12 with seat 16, transport assembly 52 disengages from first portion 20 and travels away from launch system 10 along rails 54. First portion 20 couples to second portion 24 in preparation for moving spacecraft 12 from a horizontal position to a vertical position at launch system 10. The integral operation of first portion 20, second portion 24, and transport assembly 52 provides direct and convenient delivery of a horizontally assembled, integrated, and tested spacecraft 12 to launch system 10.

Support assembly 14 may include any number and type of actuators 56 designed to provide incremental adjustments of spacecraft 12 in the horizontal position to align aft portion 36 of spacecraft 12 with seat 16. Actuators 56 may be placed on arcuate members 22, between first portion 20 and second portion 24, between second portion 24 and the ground, or at any other appropriate location in launch system 10 to adjust the position and orientation of aft portion 36 of spacecraft 12 with respect to seat 16. Actuators 56 may comprise inflatable air bags, other suitable hydraulic or pneumatic devices, electrical devices, mechanical devices, or any other appropriate devices that provide incremental adjustments to the position and orientation of spacecraft 12 while in a horizontal orientation. In a particular embodiment, transport assembly 52 may include its own actuators 56 to provide position adjustment, as well as the capability to translate spacecraft 12 along rails 54 to engage seat 16. Launch system 10 contemplates any number of actuators 56 at any appropriate location to accomplish the alignment technique discussed below with reference to FIG. 5.

An umbilical transfer mast 58 integral or separate to support assembly 14 couples to a number of access points on spacecraft 12. Transfer mast 58 provides access to spacecraft 12 for fueling, monitoring, electrical supply, and other purposes while spacecraft 12 and support assembly 14 are in the vertical position. In a particular embodiment, launch system 10 fuels spacecraft 12 in the vertical position using transfer mast 58.

FIGS. 3A–3E illustrate the operation of one embodiment of launch system 10 that includes weights 26 and a retention device 60 (FIGS. 3C and 3D) coupled to support assembly 14. In general, FIGS. 3A–3E illustrate the sequence of steps to transport spacecraft 12 to launch system 10, move spacecraft 12 from a horizontal position into a vertical position, and retract support assembly 14 in preparation for launch.

Figure 3A:
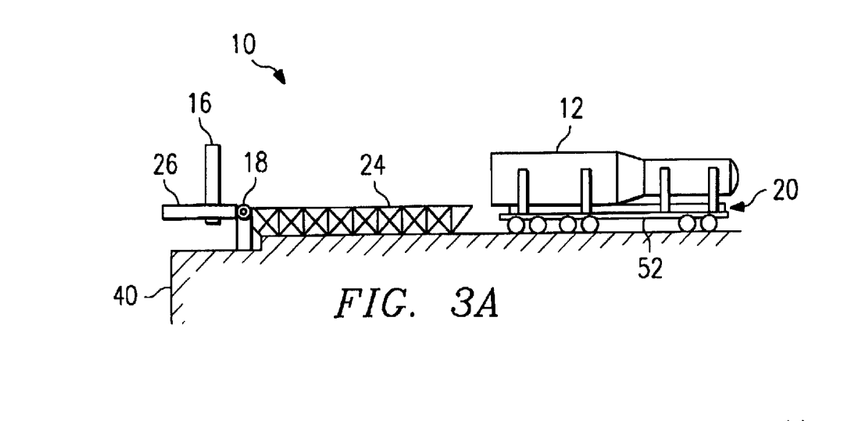
FIGS. 3A–3C illustrate the operation of one embodiment of the launch system.
Figure 3B:
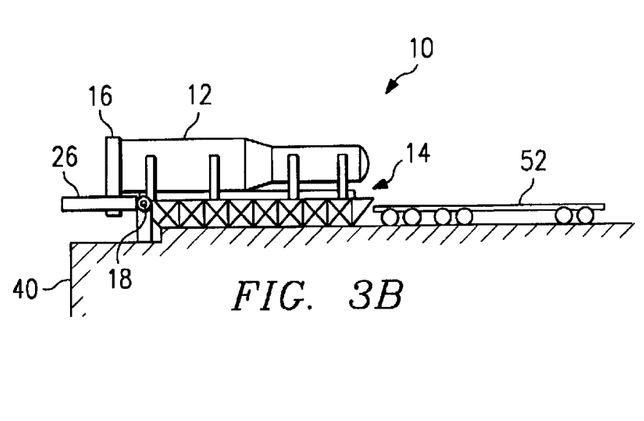

Now referring to FIG. 3A, transport assembly 52 moves spacecraft 12 supported in a horizontal position by first portion 20 from a vehicle integration facility to launch system 10. Launch system 10 receives spacecraft 12 with second portion 24 in a horizontal configuration and seat 16 perpendicular to the longitudinal axis of second portion 24. In FIG. 3B, spacecraft 12 couples to seat 16 using an alignment technique illustrated in further detail with respect to FIG. 5. Before or after alignment of spacecraft 12 to seat 16, transport assembly 52 moves away from launch system 10. In this configuration, weights 26 and aft portion 36 of spacecraft 12 that extend beyond hinge axis 19 combine to generate a rotational moment about hinge axis 19 to elevate spacecraft 12. Retention device 60 or other suitable fasteners keep spacecraft 12 and support assembly 14 in a horizontal position.

Figure 3C:
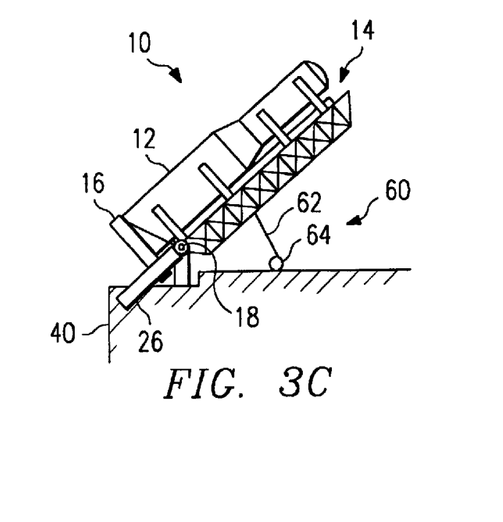

Now referring to FIG. 3C, retention device 60 permits rotation of support assembly 14 and seat 16 about hinge 18. During this transition of spacecraft 12 from a horizontal position to a vertical position, seat 16 provides a stable base to support the increasing weight of spacecraft 12 as it transitions to the vertical position. Offset 38 provides additional stability during this transition. When support assembly 14 begins to rotate about hinge axis 19, retention device 60 delivers cabling 62 at a controlled rate from spool 64 to control the transition of spacecraft 12 from the horizontal position to a vertical position. Retention device 60 may include cabling, gears, pneumatic members, or other suitable electrical or mechanical devices coupled to support assembly 14 or hinge 18 that retain or retard the rotational moment produced by weight 26 and/or offset 38. Transfer mast 58 rotates with support assembly during the transition from horizontal to vertical.

Figure 3D:
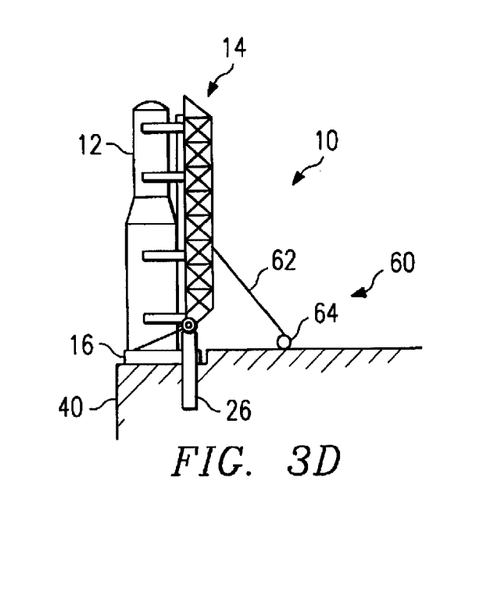
Figure 3E:
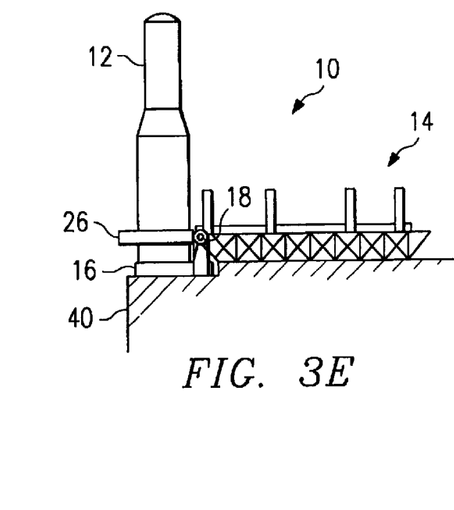
Figure 4A:
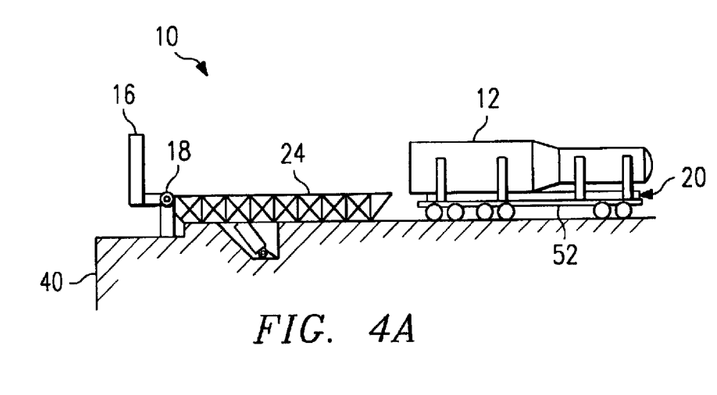
FIGS. 4A–4C illustrate the operation of another embodiment of the launch system.
Figure 4B:
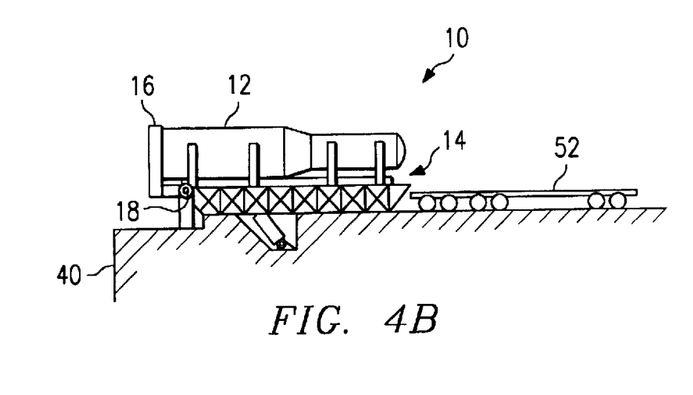
Figure 4C:
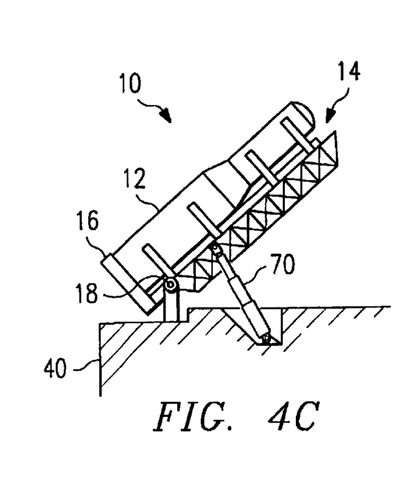
Figure 4D:
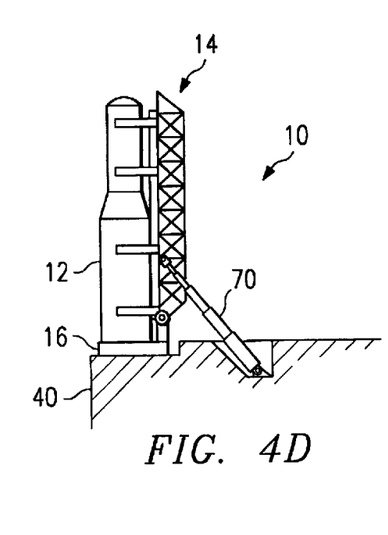
Figure 4E:
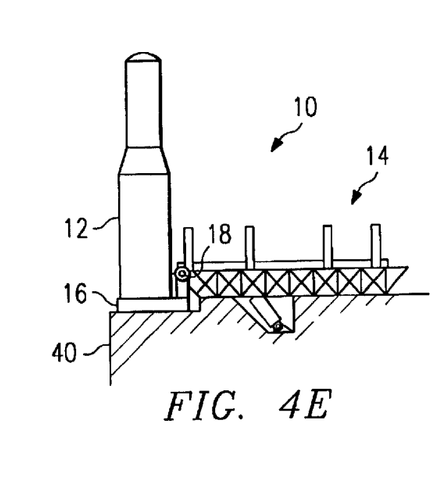

FIG. 3D illustrates spacecraft 12 in a vertical position supported by take-off pedestal 40. At this stage, spacecraft 12 may be serviced, fueled, or monitored through transfer mast 58 integral to or separate from support assembly 14. Transfer mast 58 couples to access points, such as fuel fill and discharge points, electrical power connections, and other access points on spacecraft 12. Upon refueling and final testing and check-out of spacecraft 12, retention device 60 operates to retrieve cabling 62 to return support assembly 14 into a horizontal position, as illustrated in FIG. 3E. Spacecraft 12 is now ready for launch.

FIGS. 4A–4E illustrate the operation of an alternative embodiment of launch system 10. In this embodiment, launch system 10 hoists spacecraft 12 from a horizontal position to a vertical position by actuating a pneumatic assembly 70 coupled to support assembly 14. In this embodiment, weight 26 may not be necessary, but some amount of weight 26 and/or offset 38 may reduce the operational requirements of pneumatic assembly 70 and provide additional stability to launch system 10. It should be understood that although pneumatic assembly 70 is illustrated as linear hydraulic extenders operating on each section 50 of second portion 24, launch system 10 may employ any suitable arrangement of pneumatic, hydraulic, mechanical, or electrical actuators. For example, a gearing assembly at or near hinge 18 may provide the appropriate rotational moment to move spacecraft 12 from the horizontal position to the vertical position. The present invention contemplates any means of actuating that provides rotation of support assembly 14 and seat 16 to place spacecraft 12 into a vertical position.

Figure 5:
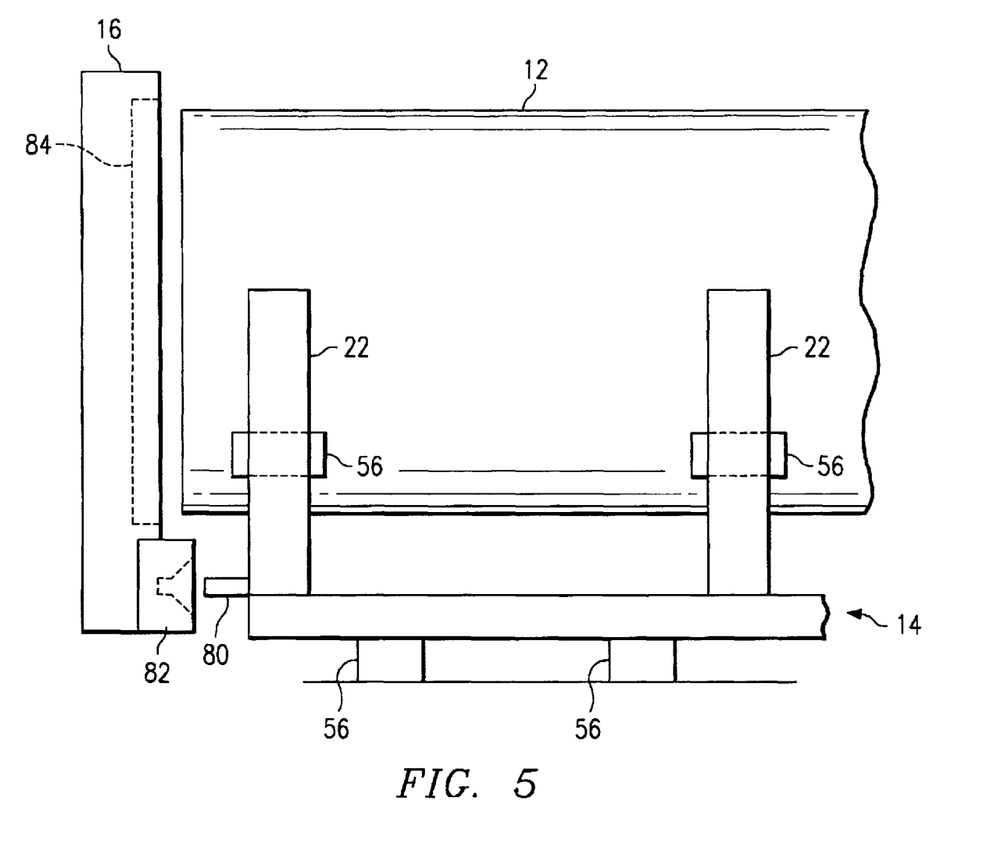
FIG. 5 illustrates in more detail the alignment technique used in the launch system.

FIG. 5 illustrates an exemplary alignment technique to ensure proper alignment of aft portion 36 of spacecraft 12 with an annular platform 84 of seat 16 before rotating spacecraft 12 to the vertical position. The alignment technique utilizes actuators 56, alignment pin 80 coupled to support assembly 14, and alignment recess 82 coupled to seat 16. To perform the alignment, pin 80 is adjusted and positioned relative to recess 82 using actuators 56 associated with transport assembly 52 or support assembly 14. Actuators 56 may include pneumatic, mechanical, or electrical actuators, rollers, levers, or other devices to adjust the position of pin 80 with respect to recess 82, and consequently the position of spacecraft 12 with respect to seat 16. Upon placing pin 80 fully into recess 82, the alignment technique ensures that aft portion 36 of spacecraft 12 properly couples to annular platform 84 of seat 16. Upon confirming proper alignment, launch system 10 rotates spacecraft 12 as described above into the vertical position for launch. The performance of the alignment technique while spacecraft 12 is still in the horizontal position ensures proper support of spacecraft 12 by seat 16 and support assembly 14 before and during transition to the vertical position.

Although the present invention has been described in several embodiments, a myriad of changes, variations, alterations, transformations and modifications may be suggested to one skilled in the art, and it is intended that the present invention encompass such changes, variations, alterations, transformations and modifications as fall within the spirit and scope of the appended claims.

What is claimed is:

1. A spacecraft launch system, comprising:
    a support assembly to support a spacecraft in a horizontal position;
    a seat to support the spacecraft during a transition from the horizontal position to a vertical position; and
    a hinge coupled to the support assembly and the seat, wherein the support assembly and the seat rotate about a hinge axis during the transition and wherein the seaport assembly but not the seat rotates about the hinge axis after the transition.

2. The system of claim 1, wherein the seat further comprises a seat member that rotates about the hinge axis at an offset.

3. The system of claim 1, wherein the seat remains perpendicular to a longitudinal axis of the support assembly during the transition.

4. The system of claim 1, wherein the support assembly comprises:
    a first portion coupled to the hinge; and
    a second portion removably coupled to the spacecraft and the first portion.

5. The system of claim 4, wherein the second portion removably couples to a transport assembly having a carriage coupled to a plurality of wheels.

6. The system of claim 1, wherein the seat comprises a support flange extending radially inward to form an annular platform that engages an aft portion of the spacecraft.

7. The system of claim 1, further comprising an umbilical transfer mast coupled to a plurality of access points on the spacecraft.

8. The system of claim 1, further comprising a plurality of actuators to align an aft portion of the spacecraft with the seat before the transition.

9. The system of claim 1, further comprising:
    a first alignment member coupled to the support assembly; and
    a second alignment member that engages the first alignment member to ensure proper alignment between the spacecraft and the seat before the transition.

10. The system of claim 9, wherein the first alignment member comprises a pin that inserts into the second alignment member.

11. The system of claim 1, further comprising a take-off pedestal coupled to the seat when the spacecraft is in the vertical position.

12. The system of claim 1, further comprising:
    a weight coupled at a position to generate a rotational moment about the hinge axis; and
    a retention device coupled to the support assembly to control the rotation of the support assembly caused by the rotational moment.

13. The system of claim 12, wherein the position of the weight is variable to adjust the amount of rotational moment about the hinge axis generated by the weight.

14. The system of claim 1, further comprising a pneumatic assembly coupled to the support assembly to generate a rotational moment about the hinge axis.

15. A method for moving a spacecraft from a horizontal position to a vertical position, the method comprising:
    supporting the spacecraft on a support assembly in a horizontal position;
    aligning an aft portion of the spacecraft with a seat;
    rotating the support assembly and the seat about a hinge axis to place the spacecraft in a vertical position; and
    rotating the support assembly but not the seat about the hinge axis after placing the spacecraft in the vertical position.

16. The method of claim 15, wherein the step of rotating further comprises fixing the seat perpendicular to a longitudinal axis of the support assembly.

17. The method of claim 15, further comprising:
    transporting the spacecraft from a vehicle integration facility using a transport assembly;
    decoupling the spacecraft from the transport assembly; and
    coupling the spacecraft to the support assembly.

18. The method of claim 15, wherein the step of aligning comprises the step of engaging a first alignment member coupled to the support assembly and a second alignment member to ensure proper alignment between the spacecraft and the seat before the step of rotating.

19. The method of claim 18, wherein the first alignment member comprises a pin operable to insert into the second alignment member.

20. The method of claim 15, wherein the step of aligning comprises the step of adjusting the position of the spacecraft using a plurality of actuators.

21. The method of claim 15, further comprising the step of supporting the seat on a take-off pedestal when the spacecraft is in the vertical position.

22. The method of claim 15, wherein the step of rotating comprises:
    coupling a weight to the support assembly at a position to generate a rotational moment about the hinge axis; and
    controlling the rotation of the support assembly caused by the rotational moment.

23. The method of claim 22, further comprising the step of moving the weight to adjust the rotational moment.

24. The method of claim 15, wherein the step of rotating comprises actuating a pneumatic assembly coupled to the support assembly.

25. A method for moving a spacecraft from a horizontal position to a vertical position, the method comprising:

supporting the spacecraft on a support assembly in a horizontal position;

aligning an aft portion of the spacecraft with a seat;

coupling an umbilical transfer mast to a plurality of access points on the spacecraft while the spacecraft is in the horizontal position;

rotating the support assembly, the seat, and the transfer mast about a hinge axis to place the spacecraft in a vertical position; and providing access to the spacecraft using the transfer mast while the spacecraft is in the vertical position.

26. A spacecraft launch system, comprising:

a support assembly having a first portion with a plurality of arcuate supports to support a spacecraft in a horizontal position, a second portion removably coupled to the first portion, and a first alignment member;

a seat having an annular platform to support an aft portion of the spacecraft during a transition from the horizontal position to a vertical position, and a second alignment member that engages the first alignment member to ensure proper alignment between the aft portion of the spacecraft and the annular platform of the seat before the transition;

a hinge coupled to the support assembly and the seat, wherein the support assembly and the seat rotate about a hinge axis during the transition; and a take-off pedestal coupled to the seat when the spacecraft is in the vertical position.

27. The system of claim 26, wherein the support assembly but not the seat rotates about the hinge axis after the transition.

28. The system of claim 26, wherein the seat remains perpendicular to a longitudinal axis of the support assembly during the transition.

29. The system of claim 26, wherein the first portion of the support assembly removably couples to a transport assembly having a carriage coupled to a plurality of wheels.

30. The system of claim 26, further comprising an umbilical transfer mast coupled to a plurality of access points on the spacecraft while the spacecraft is in the vertical position.

31. The system of claim 26, further comprising a plurality of actuators to align the aft portion of the spacecraft with the annular platform of the seat before the transition.

32. The system of claim 26, wherein the first alignment member comprises a pin that inserts into the second alignment member.

33. The system of claim 28, further comprising:

a weight coupled at a position to generate a rotational moment about the hinge axis; and a retention device coupled to the support assembly to control the rotation of the support assembly caused by the rotational moment.

34. The system of claim 33, wherein the position of the weight is variable to adjust the amount of rotational moment about the hinge axis generated by the weight.

* * * * *

UNITED STATES PATENT AND TRADEMARK OFFICE
CERTIFICATE OF CORRECTION

PATENT NO. : 6,186,039 B1
DATED : February 13, 2001
INVENTOR(S) : G. E. Mueller et al.

It is certified that error appears in the above-identified patent and that said Letters Patent is hereby corrected as shown below:

Column 5,
Line 40, (claim 1, line 9) "seaport" should read -- support --

Column 8,
Line 21, (claim 33, line 1) "claim 28," should read -- claim 26, --

Signed and Sealed this

Thirtieth Day of October, 2001

Attest:

NICHOLAS P. GODICI
Attesting Officer    Acting Director of the United States Patent and Trademark Office